(12) United States Patent
Leung et al.

(10) Patent No.: US 10,375,091 B2
(45) Date of Patent: Aug. 6, 2019

(54) METHOD, DEVICE AND ASSEMBLY OPERABLE TO ENHANCE SECURITY OF NETWORKS

(71) Applicant: Horizon Healthcare Services, Inc., Newark, NJ (US)

(72) Inventors: Alan Leung, Mount Laurel, NJ (US); Gregory D. Barnes, Newbury Park, CA (US)

(73) Assignee: Horizon Healthcare Services, Inc., Newark, NJ (US)

( * ) Notice: Subject to any disclaimer, the term of this patent is extended or adjusted under 35 U.S.C. 154(b) by 196 days.

(21) Appl. No.: 15/646,824

(22) Filed: Jul. 11, 2017

(65) Prior Publication Data

US 2019/0020666 A1      Jan. 17, 2019

(51) Int. Cl.
   *H04L 29/06* (2006.01)
(52) U.S. Cl.
   CPC ........ *H04L 63/1416* (2013.01); *H04L 63/101* (2013.01); *H04L 63/1483* (2013.01)
(58) Field of Classification Search
   CPC ........................... H04L 63/02; H04L 63/0227; H04L 63/0263; H04L 63/101–102; H04L 63/1416; H04L 63/1483; H04L 63/20
   See application file for complete search history.

(56) References Cited

U.S. PATENT DOCUMENTS

| | | | |
|---|---|---|---|
| 8,438,386 B2 * | 5/2013 | Hegli | G06F 21/577 709/216 |
| 8,510,411 B2 | 8/2013 | Coulson et al. | |
| 8,549,623 B1 | 10/2013 | Cooley | |
| 8,578,480 B2 | 11/2013 | Judge et al. | |
| 8,713,676 B2 | 4/2014 | Pandrangi et al. | |
| 8,839,418 B2 | 9/2014 | Hulten et al. | |
| 8,990,933 B1 | 3/2015 | Magdalin | |

(Continued)

FOREIGN PATENT DOCUMENTS

| | | |
|---|---|---|
| EP | 3151511 A1 | 4/2017 |
| WO | 2001038999 A1 | 5/2001 |

(Continued)

OTHER PUBLICATIONS

Combating Malicious Email and Social Engineering Attack Methods, Trend Micro, 2016.*

(Continued)

*Primary Examiner* — Minh Dinh
(74) *Attorney, Agent, or Firm* — Barclay Damon LLP

(57) ABSTRACT

A method, device and assembly are disclosed herein. Each of the method, device and assembly, in an embodiment, is operable to perform multiple steps for protecting a network, including adding resources to a blocklist if the resources satisfy a blockage condition. After a maturation period expires, the steps include determining whether the blocked resource is listed on a blacklist. The addition to the blocklist corresponds to a precautionary event, and the presence on the blacklist corresponds to a threat event. The steps include determining a correlation of the precautionary events to the threat events, and changing or adjusting the blockage condition as a result of the correlation outcome differing from a correlation target factor by a designated amount.

20 Claims, 8 Drawing Sheets

(56) References Cited

U.S. PATENT DOCUMENTS

| | | |
|---|---|---|
| 9,065,850 B1 | 6/2015 | Sobrier |
| 9,071,600 B2 | 6/2015 | Alagha et al. |
| 9,178,901 B2 | 11/2015 | Xue et al. |
| 9,258,321 B2 | 2/2016 | Amsler et al. |
| 9,363,269 B2 | 6/2016 | Srinivasan |
| 9,503,468 B1 | 11/2016 | Yen et al. |
| 9,596,264 B2 | 3/2017 | Sandke et al. |
| 9,602,523 B2 | 3/2017 | Hagar et al. |
| 2006/0123478 A1 | 6/2006 | Rehfuss et al. |
| 2008/0082662 A1 | 4/2008 | Dandliker et al. |
| 2012/0117650 A1 | 5/2012 | Nachenberg |
| 2013/0311677 A1 | 11/2013 | Coulson et al. |
| 2014/0359760 A1 | 12/2014 | Gupta et al. |
| 2015/0312267 A1 | 10/2015 | Thomas |
| 2016/0127461 A1 | 5/2016 | Levow et al. |
| 2017/0041333 A1 | 2/2017 | Mahjoub et al. |
| 2017/0048273 A1 | 2/2017 | Bach |
| 2017/0063893 A1 | 3/2017 | Franc et al. |
| 2017/0078321 A1 * | 3/2017 | Maylor ............... H04L 63/1433 |
| 2017/0099314 A1 | 4/2017 | Klatt et al. |
| 2017/0099319 A1 | 4/2017 | Hunt et al. |

FOREIGN PATENT DOCUMENTS

| | | |
|---|---|---|
| WO | 2014063520 A1 | 5/2014 |
| WO | 2015094294 A1 | 6/2015 |
| WO | 2016201938 A1 | 12/2016 |

OTHER PUBLICATIONS

Andale; "Statistics How To"; Correlation Coefficients, Definitions, Pearson's Correlation Coefficient; ; retrieved from the Internet Jun. 14, 2017; <https://web.archive.org/web/20170613143009/http://www.statisticshowto.com/what-is-the-correlation-coefficient-formula/>, 6 pages.

Blue Coat; Symantec Corporation; retrieved from the Internet Jul. 10, 2017; <http://www.bluecoat.com/?gclid=C1f2k77A_9QCFYIXDQodvrsE6Q>, 5 pages.

ExtraHop; "Hunt Ransomware in Real Time"; retrieved from the Internet Jul. 10, 2017; <https://www.extrahop.com/>; 9 pages.

Network Protection Technologies; Apr. 10, 2017; 13 pages.

* cited by examiner

FIG. 7

Number of Domains Identified

82,573 ~84

List of Baby Domains ~83

| DomainName ≑ | RiskScore ≑ |
|---|---|
| kralu.us | |
| grcart.com | |
| basement-design.info | |
| vatfs.us | |
| buyersedgetravel.com | |
| pope.us | |
| surpluspalette.com | |
| decordecorated.com | |
| nuvo2.us | |
| mobyproject.org | |

« prev [1] 2 3 4 5 6 7 8 9 10 next »

Bluecoat Domains Accessed by User Count ~90

| Domain ≑ | Unique Users ≑ | Hit Count ≑ |
|---|---|---|
| madphatn.review | 3 | 143 |
| handsofthealthcareni.org | 8 | 67 |
| pages.co | 3 | 30 |
| javagm.com | 2 | 25 |
| mobyproject.org | 2 | 17 |
| sneakystamp.com | 4 | 9 |
| basement-design.info | 1 | 5 |
| celebritynetworth.wiki | 3 | 5 |
| oneofonejewelry.com | 2 | 5 |
| neoms.net | 3 | 5 |

« prev [1] 2 3 4 next »

Number of Baby Domains Identified

801 ~86

ExtraHop Events by Domain ~100

| DomainName ≑ | Hit Count ≑ |
|---|---|
| developedmind.com | 1050 |
| ogrin.us | 10 |
| personalmailingcenter.co | 10 |
| niemed.co | 9 |
| tracksackeys.us | 7 |
| 1ctxpm.info | 6 |
| allgreenpears.com | 6 |
| bulikeiser.no | 6 |
| celebritynetworth.wiki | 6 |
| greenasswork.com | 6 |

« prev [1] 2 3 4 next »

METHOD, DEVICE AND ASSEMBLY OPERABLE TO ENHANCE SECURITY OF NETWORKS

BACKGROUND

In the ordinary course of business, companies rely upon their employees to access and use the companies' data networks. A company's data network typically includes multiple servers for operating the company's email system, storing its confidential and proprietary data and materials, and enabling its employees to access software tools, browse the Internet, and generate and store documents.

Since each employee's device is coupled to both the data network and the Internet, the data network is vulnerable to harmful intrusions originating through the Internet. For example, wrongdoers can use phishing tactics to break into the data network and obtain personal or confidential information of the company and its employees and customers. Often, the wrongdoer creates an email message and an illegitimate website in a way that resembles the appearance of the company's actual website and branding. The wrongdoer then sends the spoofed email to an employee including a hyperlink to the illegitimate website. The employee then clicks on the link and enters sensitive information at the illegitimate website, unknowingly providing the wrongdoer with sensitive information. The wrongdoer can use this information to perform harmful acts, such as: (a) gaining access to the company's data network, potentially copying confidential and proprietary data; (b) infecting the company's data network or systems with malware, such as viruses and ransomware; and (c) using the entered information (e.g., social security number, driver's license number, name and company passwords) for identity theft or other illegal purposes.

For protection, companies use network firewalls designed to prevent employees from accessing harmful websites. The firewalls, developed by software security firms, include a blacklist of website Uniform Resource Locators (URLs) that the firms know or suspect to be malicious. The software security firms make efforts to monitor URLs, identify signs of illegitimacy, and update their blacklists from time to time.

A major challenge, however, relates to newly-registered URLs. There is little information, good or bad, about newly-registered URLs. For example, it can take thirty (30) days or more for software security firms to realize that a newly-registered URL is suspicious or malicious, belonging on their blacklists. Knowing about this delay, it is common for a wrongdoer to create a new URL and make cyberattacks before the new URL is added to the blacklists. After a relatively short time (e.g., 5 days), the wrongdoer abandons that URL and creates an additional new URL. The wrongdoer then uses the additional new URL to make another set of cyberattacks before security firms are able to add it to their blacklists.

As a result, the data networks of companies are exposed to cyberattacks by newly-registered URLs. This exposure can cause substantial damage, loss and harm to the company's assets, reputation and business. Likewise, this exposure can cause substantial damage, loss and harm to the property and lives of the company's employees, customers and affiliates.

The foregoing background describes some, but not necessarily all, of the problems, disadvantages and shortcomings related to the known approaches to protect data networks from wrongdoers and their cyberattacks.

SUMMARY

In an embodiment, the method includes: (a) monitoring a network for a plurality of requests to access a plurality of resources; and (b) blocking each of the resources that satisfies a blockage condition. The blockage condition includes at least one variable associated with an age factor. The method also includes adding each of the blocked resources to a blocklist. Each of the blocked resources is associated with a maturation period that depends, at least in part, on a creation date of the blocked resource. A presence of each of the blocked resources on the blocklist corresponds to a precautionary event. After the maturation periods expire for a batch of the blocked resources, the method includes determining whether each of the blocked resources of the batch is listed on a blacklist. A presence of one of the blocked resources on the blacklist corresponds to a threat event, and an absence of one of the blocked resources from the blacklist corresponds to a non-threat event. The method also includes determining a correlation outcome for the batch of the blocked resources. The correlation outcome represents a correlation of the precautionary events to the threat events. If the correlation outcome is less than a correlation target factor, the method includes increasing the at least one variable and, in the future, repeating the blocking step for any resources that satisfy the blockage condition. If the correlation outcome is greater than the correlation target factor, the method includes decreasing the at least one variable and, in the future, repeating the blocking step for any resources that satisfy the blockage condition. The increasing (if any) or decreasing (if any) of the at least on variable is operable to reduce blockage of any of the resources that corresponds to one of the non-threat events. As described below, this reduces false positive outcomes.

In another embodiment, one or more data storage devices includes one or more instructions that, when executed by a processor, perform a plurality of steps. The steps include: (a) monitoring a network for a plurality of requests to access a plurality of resources; and (b) blocking each of the resources that satisfies a blockage condition. The blockage condition includes at least one variable. The steps also include adding each of the blocked resources to a blocklist. Each of the blocked resources is associated with a maturation period that depends, at least in part, on a creation date of the blocked resource. A presence of each of the blocked resources on the blocklist corresponds to a precautionary event. After the maturation period expires for each of the blocked resources, the steps include determining whether the blocked resource is listed on a blacklist. A presence of the blocked resource on the blacklist corresponds to a threat event. Also, the steps include: (i) determining a correlation outcome that represents a correlation of the precautionary events to the threat events; and (ii) changing the at least one variable in response to the correlation outcome differing from a correlation target factor by a designated amount.

In yet another embodiment, the assembly includes: (a) one or more processors; and (b) one or more data storage devices operatively coupled to the one or more processors. The one or more data storage devices include instructions that, when executed by the one or more processors, perform a plurality of steps. The steps include monitoring a network for a plurality of requests to access a plurality of resources. The steps also include blocking each of the resources that satisfies a blockage condition. The blockage condition includes at least one variable. Also, the steps include adding each of the blocked resources to a blocklist. Each of the blocked resources is associated with a maturation period that depends, at least in part, on a creation date of the blocked resource. A presence of each of the blocked resources on the blocklist corresponds to a precautionary event. After the maturation period expires for each of the blocked resources, the steps include determining whether the blocked resource is listed on a blacklist. A presence of the blocked resource on the blacklist corresponds to a threat event. Also, the steps include determining a correlation outcome that represents a correlation of the precautionary events to the threat events. The steps include changing the at least one variable in response to the correlation outcome differing from a correlation target factor by a designated amount.

Additional features and advantages of the present disclosure are described in, and will be apparent from, the following Brief Description of the Drawings and Detailed Description.

BRIEF DESCRIPTION OF THE DRAWINGS

FIG. 7 is a top view of an example of an embodiment of portions of an interface displaying outputs of the security module.

DETAILED DESCRIPTION

Figure 1:
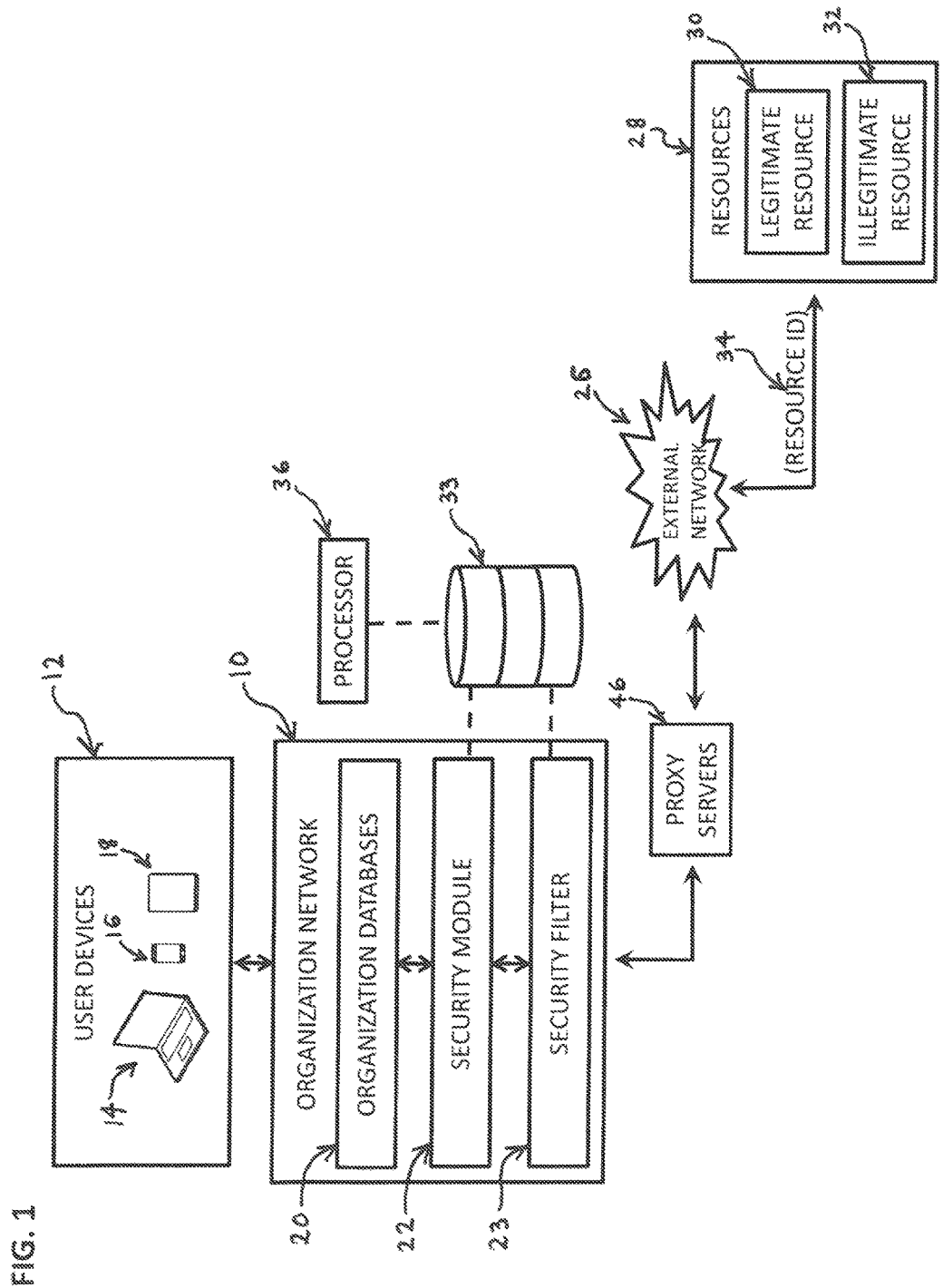
FIG. 1 is a schematic, block diagram illustrating an embodiment of an organization network operatively coupled to user devices and resources.

An organization can own or operate a plurality of data networks, such as organization network 10, as illustrated in FIG. 1. Depending upon the embodiment, organization network 10 can include a local area network ("LAN") or a wide area network ("WAN"). The organization can include, but is not limited to, a product manufacturer, distributor, service provider (e.g., law firm, consulting firm, accounting firm or investment banker) or insurance provider for health, life or property insurance. In an embodiment, the organization network 10 is accessible to user devices 12, including, but not limited to, computers 14, smartphones 16 and electronic tablets 18. The user devices 12 are operated by the organization's users, including employees and other authorized individuals. The user devices 12 include network access devices, and depending upon the configuration of the organization network 10, the user devices 12 can access the organization network 10 through a hardwire connection, ethernet connection or wireless (e.g., Wi-Fi) connection.

As illustrated in FIG. 1, in an embodiment, the organization network 10 includes: (a) one or more organization data storage devices or organization databases 20; (b) a security module 22 as described below; and (c) a security filter 23 as described below. In an embodiment, the organization databases 20 store enterprise-wide computer programs or software, such as email systems, document management systems for creating, storing an accessing confidential and proprietary data and documents, Internet browsers, Internet-based remote access, desktop sharing systems and mobile applications as well as other software tools and applications. The organization databases 20 also store some or all of the data and electronic files associated with such programs, software, tool and applications.

By accessing the organization network 10, a user device 12 can access an external network 26, such as an LAN or WAN that is not controlled by the organization. In an embodiment, the external network 26 includes the world wide web (the web portion of the Internet) or another portion of the Internet.

Also, while accessing the external network 26, a user device 12 can access (or attempt to access) one or more resources 28 that are available through the external network 26. As illustrated in FIG. 1, the resources 28 can include legitimate resources 30 and illegitimate resources 32.

A legitimate resource 30, in an embodiment, includes a resource that is not operated or used by a wrongdoer or a resource that otherwise has a lawful purpose in the area of business, non-business, education, technology, politics, news, socialization, entertainment or other areas. An illegitimate resource 32, in an embodiment, includes a resource that: (a) is associated with an illegitimate purpose, a malicious purpose, a wrongful purpose, a harmful purpose, a threatening purpose, an illegal purpose, a trespass purpose, a damaging purpose, a theft purpose, a ransom purpose, a cyberattack purpose, an infection purpose or any other illegitimate or damaging purpose; or (b) includes or incorporates any computer code, data, data file, hyperlink or computer program that has, or is associated with, any of the foregoing purposes.

In an embodiment, each resource 28 has a unique identifier 34. For example, in an embodiment, the resources 28 are domains (e.g., websites). The identifier 34 of each such domain includes: (a) a unique URL, such as www.example1.com; and (b) the unique numeric identification corresponding to such URL, such as an Internet Protocol ("IP") address (for example, 172.16.254.1).

During the operations of an organization, wrongdoers can use various tactics to gain unauthorized access to the organization databases 20, to attack, disable or impair the organization network 10 or a portion thereof, or to otherwise wrongfully obtain personal, sensitive, confidential or private information from users of the user devices 12.

As described above, one such tactic includes phishing. With phishing, the wrongdoer's goal is to break into the organization network 10 or otherwise obtain personal, confidential or sensitive information of the user, the organization or its customers or affiliates. Often, the wrongdoer creates an email message and an illegitimate website in a way that resembles the appearance of the organization's actual website, using color patterns, trademarks and branding similar to that of the organization. The wrongdoer then sends a spoofed or bogus email to the user including a hyperlink to an illegitimate resource 32, such as the illegitimate website. When the user clicks on such hyperlink and enters information at the illegitimate resource 32, the wrongdoer can perform several harmful acts, such as: (a) gaining access to the organization network 10 to copy, download, take, disable or destroy confidential or proprietary data of the organization or its employees, affiliates or customers, including, but not limited to, health information or personal information of such customers; (b) infecting the organization network 10 or portions thereof with malware, such as viruses and ransomware; and (c) using the information entered by the user (e.g., social security number, driver's license number, name, address, and organizational sign-in credentials, such as username-password combinations for accessing portions of the organization network 10) for identity theft, accessing the organization databases 20, or other illegal or illegitimate purposes.

In an embodiment, the security module 22 and security filter 23 are stored within one or more data storage devices, such as security databases 33. In an embodiment, the security databases 33 have relational architecture that defines a plurality of data fields, including, but not limited to, fields to receive a URL, username, IP address of a user device 12, IP address of the sought-after resource 28 and top-level domain ("TLD") extension.

Also, the security databases 33 are operatively coupled to, and executed by, one or more processors, such as processor 36. Depending upon the embodiment, the processor 36 can include a microprocessor, circuit, circuitry, controller or other data processing device. In an embodiment, the processor 36 is a portion of the organization network 10.

The security module 22 includes a plurality of computer-readable instructions, software, computer code, computer programs, logic, data, data libraries, data files, graphical data and commands that are executable by processor 36. In operation, the processor 36 cooperates with the security module 22 to perform the functions described in this description. From time to time in this description, the security module 22 (or portions thereof) may be described as performing various functions with the understanding that such functions involve the execution role of the processor 36 or another processor.

In an embodiment, the security filter 23 includes a network gateway, network screen or network barrier configured to guard the organization network 10 from wrongful attacks and unauthorized access by illegitimate resources 32 or resources 28 that are potentially illegitimate. The security filter 23, in an embodiment, includes a firewall 24 and the active blocklist 60 described below, together with suitable data, computer code and software executable by the processor 36 to filter-out harmful or potentially harmful resources 28.

Depending upon the embodiment, the firewall 24 can include an information technology ("IT") security software product supplied and updated by a network security provider, such as the network firewall products that are commercially available through Symantec Corporation or Cisco Systems, Inc. The firewall 24 is operatively coupled to a server or blacklist source 35 operated by such a security provider.

Once the firewall 24 is installed or activated, the one or more blacklist sources 35 of the security provider periodically and continuously feed data to the firewall 24 to help keep the firewall protection up to date in the wake of illegitimate resources 32, viruses and cyberattacks that emerge from time to time. In this updating process, the security provider builds and maintains a firewall blacklist 37 of the resources 28 discovered or determined by the security provider to be actually or potentially harmful. In an embodiment, the firewall blacklist 37 includes a data array, arraylist or data library. The library stores a unique numeric or binary code corresponding to each one of the resources 28 discovered or determined by the security provider to be actually or potentially harmful. In operation, the firewall 24 prevents any user device 12 from accessing any of the resources 28 on the firewall blacklist 37. It should be appreciated that the resources 28 on the firewall blacklist 37 could be illegitimate resources 32 or legitimate resources 30 that are assessed by the security provider to be suspicious of being illegitimate or harmful.

In an embodiment, the security filter 23, based on the firewall blacklist 37 and active blocklist 60, is configured to block, in real time, all web traffic associated with the resources 28 listed on such lists. In an embodiment, such web traffic includes, but is not limited to, Domain Name Server ("DNS") communications, HTTP communications, HTTPS communications, Free Transfer Protocol ("FTP") communications, and potential communications through Transmission Control Protocol ("TCP") ports or User Datagram Protocol ("UDP") ports.

Figure 2:
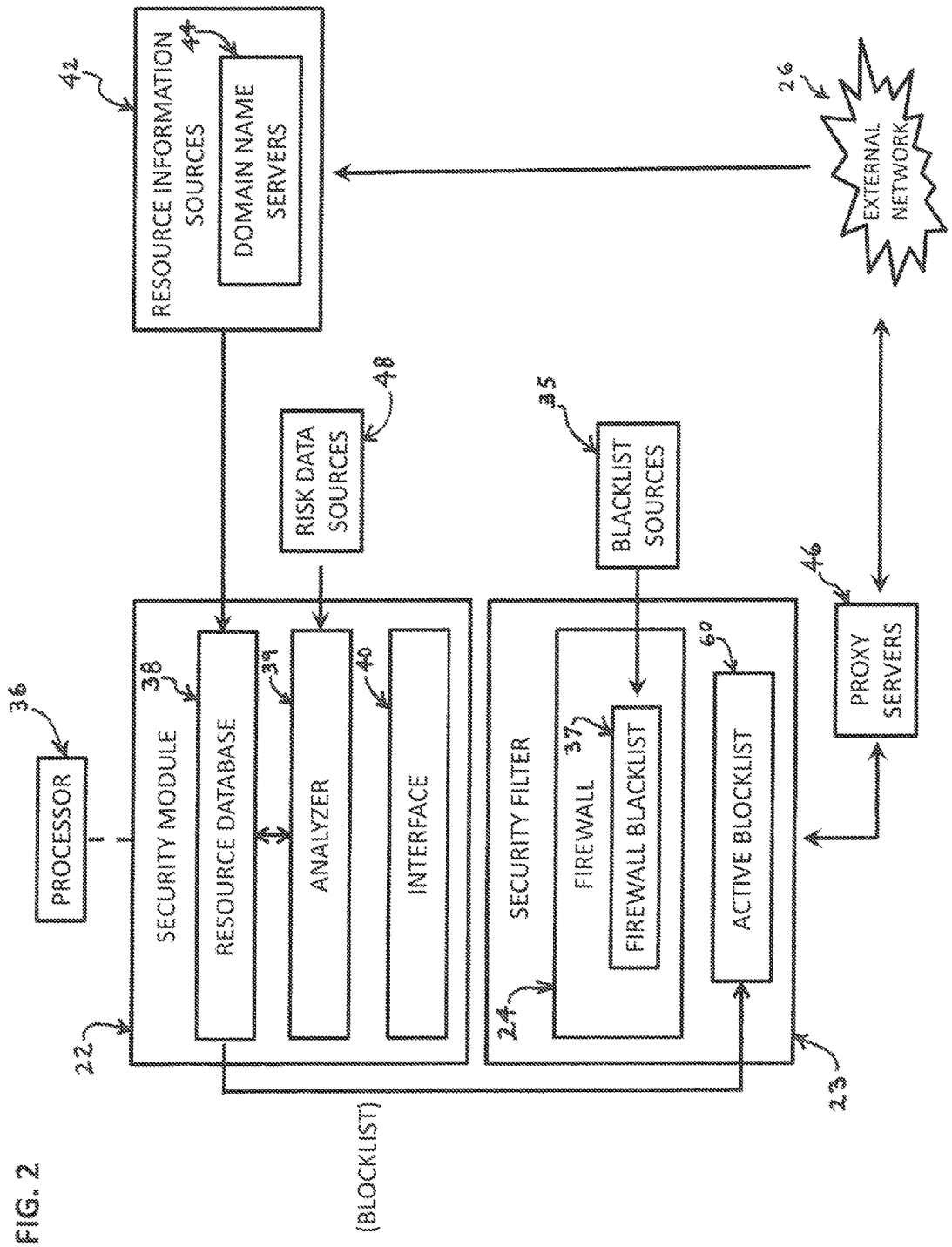
FIG. 2 is a schematic, block diagram illustrating an embodiment of the security module operatively coupled to an external network and receiving data feeds from resource information sources, risk data sources and blacklist sources.
Figure 3:
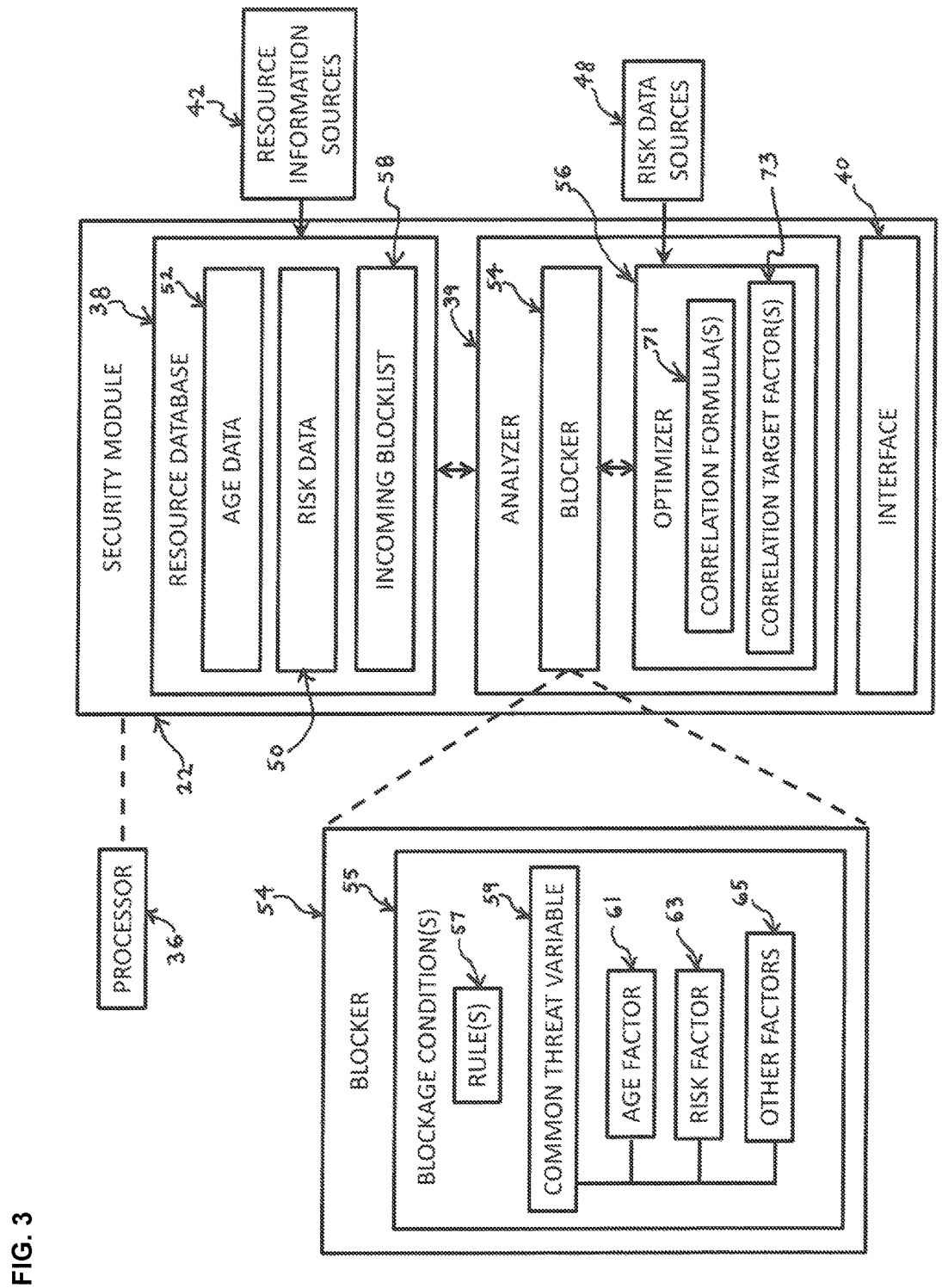
FIG. 3 is a schematic, block diagram illustrating an embodiment of the security module including a security database, an analyzer and an interface, wherein the analyzer includes a blocker which, in turn, includes a blockage condition.

As illustrated in FIGS. 2-3, the security module 22 includes a resource database 38, an analyzer 39 operatively coupled to the resource database 38, and an interface 40, as described below. The security module 22 is operatively coupled to a plurality of resource information sources 42. In an embodiment, the resource information sources 42 include a plurality of domain name servers 44 and a plurality of proxy servers 46. The domain name servers 44 store and archive records and information related to resources 28, including, but not limited to, registration information, such as information available through WHOIS queries (e.g., owner name and host country) and the domain creation date or registration date for each resource 28. The domain name servers 44 also translate domain names (for example, www.example1.com) to unique numeric identifications, such as 172.16.254.1. In an embodiment, the resource information sources 42 include data sources or data feeds generated by commercially-available, software-based systems that are operatively coupled to network devices. The network devices inspect packets as the packets propagate the network 26. The network devices provide summary data related to the network traffic associated with such packets.

As described below, the proxy servers 46 (each of which includes a computer system and software application) act as intermediaries for requests from user devices 12. The requests are routed through the organization network 10. The proxy servers 46 receive the requests, intercept them and await permission from the organization network 10 before granting the requests.

In addition, the analyzer 39 of security module 22 is operatively coupled to a plurality of risk data sources 48, such as servers or databases of third party risk data providers. The risk data sources 48 feed risk data 50 (FIG. 3) to the analyzer 39, and the analyzer 39 transmits the risk data 50 to the resource database 38.

The risk data 50 is related to or indicative of the risk levels of resources 28. Depending upon the embodiment, the risk data 50 can include, but is not limited to, risk levels, scores, grades, ratings, factors, metrics and information in quantitative form, qualitative form or a combination thereof. The risk data providers monitor the events involving resources 28, such as publicly-available news reports, findings, indications or signs of wrongdoing, illegitimacy or threat.

From the date that a resource 28 is first registered or created, the risk data providers begin the monitoring process to generate risk data 50. However, at the early age of a resource 28 (e.g., under 30 days old), there is often a relatively low amount of information, good or bad, about the resource 28. Consequently, the score data 50 regarding the young resources 28 can be unavailable, unreliable or of relatively little significance. As described below, the security module 22 uses the age data 52 to provide enhanced security in view of such potentially unavailable, unreliable or insignificant risk data 50.

In operation, the proxy servers 46 detect resources 28 by monitoring all traffic to and from the organization network 10, detecting resource protocols, including, but not limited to, Hypertext Transfer Protocol ("HTTP"), Hypertext Transfer Protocol Secure ("HTTPS"), TCP and UDP traffic. When a proxy server 46 detects that a user device 12 has attempted to access a resource 28, the proxy server 46 intercepts the access request, preventing access until receiving an approval message from the processor 36. This provides network-level protection to the entire organization network 10.

Then, the security module 22 retrieves the registration date or creation date of each resource 28 from the domain name servers 44. Using these dates, the security module 22 determines the ages of the resources 28. The security module 22 then stores the age information of the resources 28 as age data 52 (FIG. 3) in the resource database 38. As time passes, the security module 22 automatically updates the age data 52 to indicate the aging (and current ages) of the resources 28. In an embodiment, the age data 52 includes the age levels or ages of the resources 28 at any given point in time.

As illustrated in FIG. 3, the analyzer 39 includes a blocker 54 and an optimizer 56. The blocker 54 specifies or includes at least one blockage condition 55. In an embodiment, the blockage condition 55 specifies or includes: (a) at least one rule 57; (b) a common threat variable 59; and (c) a plurality of factors mathematically coupled to the common threat variable 59, including a threshold or designated age factor 61 and a threshold or designated risk factor 63. Depending upon the embodiment, other factors 65 can be mathematically coupled to the common threat variable 59.

In an embodiment, the rule 57 includes an age condition or age rule. In an embodiment, according to the rule 57, if the age of a resource 28 is less than the designated age factor 61 (e.g., fifteen (15) days, thirty (30) days, sixty (60) days or any other suitable age), the blocker 54 automatically adds such resource 28 to the incoming blocklist 58 of the resource database 38. In another embodiment, the rule 57 includes age-risk criteria that specifies: (a) a designated age factor 61; and (b) a threshold or designated risk factor 63. In an embodiment, according to such rule 57, if the age level and risk level of a resource 28 do not, in the aggregate, satisfy designated criteria, the blocker 54 automatically adds such resource 28 to the incoming blocklist 58 of the resource database 38.

Depending upon the embodiment, the blockage condition 55 can include or specify any suitable mathematical criteria, metric, formula, algorithm, factor, constant or parameter, including, but not limited to, a ratio, product, sum or other mathematical function including or involving a designated age factor (e.g., the result of 30 minus the resource's current age) and/or a designated risk factor (e.g., a risk score of 3 on a scale of 1-10, where an increase represents higher risk).

In an embodiment, the common threat variable 59 is a single numerical factor of ten (10), twenty (20), thirty (30), forty (40), fifty (50) or any other number. Such common threat variable 59 is mathematically coupled to both the designated age factor 61 and the designated risk factor 63 of the blockage condition 55. As described below, the optimizer 56 is operable to automatically adjust such common threat variable 59 upward or downward, for example, by increments of one, two or three, or fractions thereof. This results in an adjustment of both the age requirement and the risk requirement, collectively, for the resources 28. It should be appreciated that the function of the blockage condition 55 can be adjusted by changing one or more variables of the blockage condition 55, such as the common threat variable 59, the designated age factor 61, the designated risk factor 63 and/or other factors 65.

In one example, the blockage condition 55 allows access to a resource 28 if the risk score is relatively low (for example, in the case of a relatively safe .GOV resource 28) even if the age of such resource 28 is less than the designated age factor 61. In another example, the blockage condition 55, mandates a blockage if a resource 28 is more than fifty percent (50%) younger than the designated age factor 61 regardless of the risk score of such resource 28.

The incoming blocking list or incoming blocklist 58, in an embodiment, includes a data array, arraylist or data library. The library stores a unique numeric or binary code corresponding to each one of the resources 28 that fulfills the blockage condition 55. In an embodiment, the presence of a resource 28 on the incoming blocklist 58 corresponds to, indicates or constitutes a protective or precautionary event. The presence of a resource 28 on the firewall blacklist 37 corresponds to, indicates or constitutes a threat characteristic or threat event. The absence of a resource 28 from the firewall blacklist 37 corresponds to, indicates or constitutes a non-threat event. As described below, the security module 22 periodically determines a correlation of the precautionary events to the threat events to optimize the security module 22.

After the blocker 54 adds a resource 28 to the incoming blocklist 58 of the resource database 38, the security module 22 sends a request to the firewall 24 to determine whether such resources 28 is already on the blacklist 37. If such resource 28 is not on the blacklist 37, the security module 22 adds such resource 28 to the active blocklist 60 of the security filter 23. If, at that point, such resource 28 is on the blacklist 37 or the active blocklist 60, the security module 22 denies the proxy servers 46 from enabling access to such resource 28. This provides network-level protection to the entire organization network 10, protecting against young resources 28.

The active blocking list or active blocklist 60, in an embodiment, includes a data array, arraylist or data library. The library stores a unique numeric or binary code corresponding to each one of the resources 28 that has been added to the active blocklist 60 by the security module 22. In an embodiment, the presence of a resource 28 on the active blocklist 60 corresponds to, indicates or constitutes a protective or precautionary event, just as the addition of the resource 28 to the incoming blocklist 58 corresponds to, indicates or constitutes a protective or precautionary event.

In operation, the blocker 54 acts relatively quickly to add the applicable resources 28 to the active blocklist 60. For example, the blocker 54, in an embodiment, performs such steps in less than five seconds, less than four seconds, less than three seconds, less than two seconds, less than one second, less than one-half of a second, less than one-fourth of a second or less than one-eighth of a second. In an embodiment, when a user device 12 attempts to access a resource 28 on the active blocklist 60, the interface 40 displays a message, such as "ACCESS DENIED" or "To help protect our systems, Organization X's Firewall has blocked access to this site."

In an embodiment, the security module 22 automatically removes each resource 28 from the active blocklist 60 after or upon the expiration of a maturation period. In an embodiment, the maturation period expires when such resource matures to the designated age level or age factor 61 specified in the blocker 54. The security module 22 can perform such removal, depending upon the embodiment, within a relatively short period after such maturation period expires, such as twenty-four (24) hours, (12) hours, (1) hour, fifteen minutes (15) minutes, one (1) minute, one (1) second or a fraction of a second. By the expiration of the maturation period, the blacklist sources 35 are expected to have added such resource 28 to the firewall blacklist 37 if, in fact, such resource 28 was assessed to be an illegitimate resource 32, a suspicious resource 28 or potentially illegitimate or harmful resource 28. If such resource 28 is not on the firewall blacklist 37 by the expiration of such maturation period, the security module 22 automatically sends an approval message to the proxy servers 46, enabling user devices 12 to access such resource 28.

It should be appreciated that the resources 28 on the incoming blocklist 58 and active blocklist 60 could be illegitimate resources 32 or legitimate resources 30 that are suspicious of being illegitimate or harmful. Also, in an embodiment not illustrated, the active blocklist 60 is a part of the security module 22 rather than being located within the security filter 23. In such embodiment, the security module 22 uses the active blocklist 60 to approve or deny requests from the proxy servers 46. In another embodiment not illustrated, there is a single blocking list or single blocklist that replaces the incoming blocklist 58 and active blocklist 60. The security module 22, which includes such single blocklist, updates such single blocklist to ensure that such single blocklist only lists resources 28 that are not on the firewall blacklist 37. As described above, the firewall blacklist 37 is updated periodically based on data feeds from blacklist sources 35.

All resources 28, legitimate and illegitimate, start-off young. One of the disadvantages of blocking all young resources 28 is the risk of blocking a resource 28 that is actually a legitimate resource 30. This disadvantage can be particularly problematic during those periods when there is a spike or relatively sharp increase in the quantity of newly-created resources 28. For example, various business, social, political, economic, regulatory, legal and other events in society can cause a boom in registrations of new resources 28. For example, the government of a country may enact a new tax law that has sweeping effects on the mass population of the country. In response, there could be a high quantity of consulting firms that are formed specifically to help individuals understand, implement and comply with the new law. Within the first twelve (12) months after the enactment of the new law, there could be hundreds of thousands of new resources 28 registered by these new consulting firms. Blocking all young resources 28 during such a spike or boom period can cause a substantial false-positive blockage of resources 28 that are legitimate.

To overcome or lessen these disadvantages and challenges, the optimizer 56 (FIG. 3) dynamically, continuously and automatically optimizes the security module 22 to account for such boom periods and other factors that might contribute to false-positive outcomes. In an embodiment, the optimizer 56 performs such optimization functionality according to the method illustrated in FIG. 4. First, the security module 22 receives a request from a user device 12 to access a resource 28, and the security module 22 then determines the identifier 34 of such resource 28, such as its IP address, as illustrated by step 62.

Next, the security module 22 determines whether such resource 28 fulfills (i.e., is caught by) the blockage condition 55, as illustrated by step 64. If such resource 28 does not fulfill the blockage condition 55, the security module 22 unblocks such resource 28 and authorizes the proxy servers 46 to enable access to such resource 28, as illustrated by step 66. If such resource 28 does fulfill (i.e., is caught by) the blockage condition 55, the security module 22 adds such resource 28 to the incoming blocklist 58, as illustrated by step 67.

In an embodiment, the time from the request of such user device 12 to the completion of steps 62, 64, 66 and 67, takes two (2) seconds or less. To achieve this speed, the security module 22 embodies several technical advantages. For example, in an embodiment, the security module 22 avoids performing an energy-intensive, time-intensive synchronization of all of the data in the incoming blocklist 58 with all of the data in the firewall blacklist 37 and active blocklist 60. Instead of such synchronization, the security module 22 checks for a single match of a resource 28 on the incoming blocklist 58 with a resource 28 on the firewall blacklist 37. Once this step is performed, such resource 28 is removed or deleted from the incoming blocklist 58. Accordingly, the volume of data in the incoming blocklist 58 is relatively low. This results in a memory-saving, technical advantage of the security module 22.

After adding the applicable resource 28 to the incoming blocklist 58, the security module 22 automatically updates the active blocklist 60 based on the incoming blocklist 58 and firewall blacklist 37. Accordingly, in an embodiment, every resource 28 that is caught by the blockage condition 55 is initially blocked and remains on the active blocklist 60 until such resource 28 reaches the age of the designated age factor 61 (FIG. 3). When such resource 28 reaches the age of the designated factor 61, the security module 22 automatically removes such resource 28 from the active blocklist 60. The security module 22 then authorizes the proxy servers 46 to enable access to such resource 28 unless such resource 28 is on the firewall blacklist 37. It should be appreciated that, in an embodiment, an IT staff member can manually unblock a resource 28 any time after such resource 28 has been added to the active blocklist 60.

Periodically, the optimizer 56 performs a look-back optimization process. As illustrated by step 68 in FIG. 4, the optimizer 56 automatically waits for a maturation period to expire for a batch of resources 28 that were, in the past, detected by the blocker 54 as having ages under the designated age factor 61. Based on the blockage condition 55, it is possible that the blocker 54 blocked some of the resources 28 in the batch, adding them to the active blocklist 60. Each such blockage (i.e., addition to the active blocklist 60) would be considered a protective or precautionary event. It is also possible that the blocker 54 allowed access to other resources 28 in the batch, never adding them to the active blocklist 60.

Upon or after the expiration of the maturation periods for those resources 28 of the batch that are on the active blocklist 60, the analyzer 39 (FIG. 3) automatically removes such resources 28 from the active blocklist 60. In an embodiment, the maturation period is the same as the designated age factor 61. In such case, the maturation period ends when such resources 28 are unblocked—removed from the active blocklist 60. In another embodiment, however, the maturation period is greater than the designated age factor 61.

Figure 4:
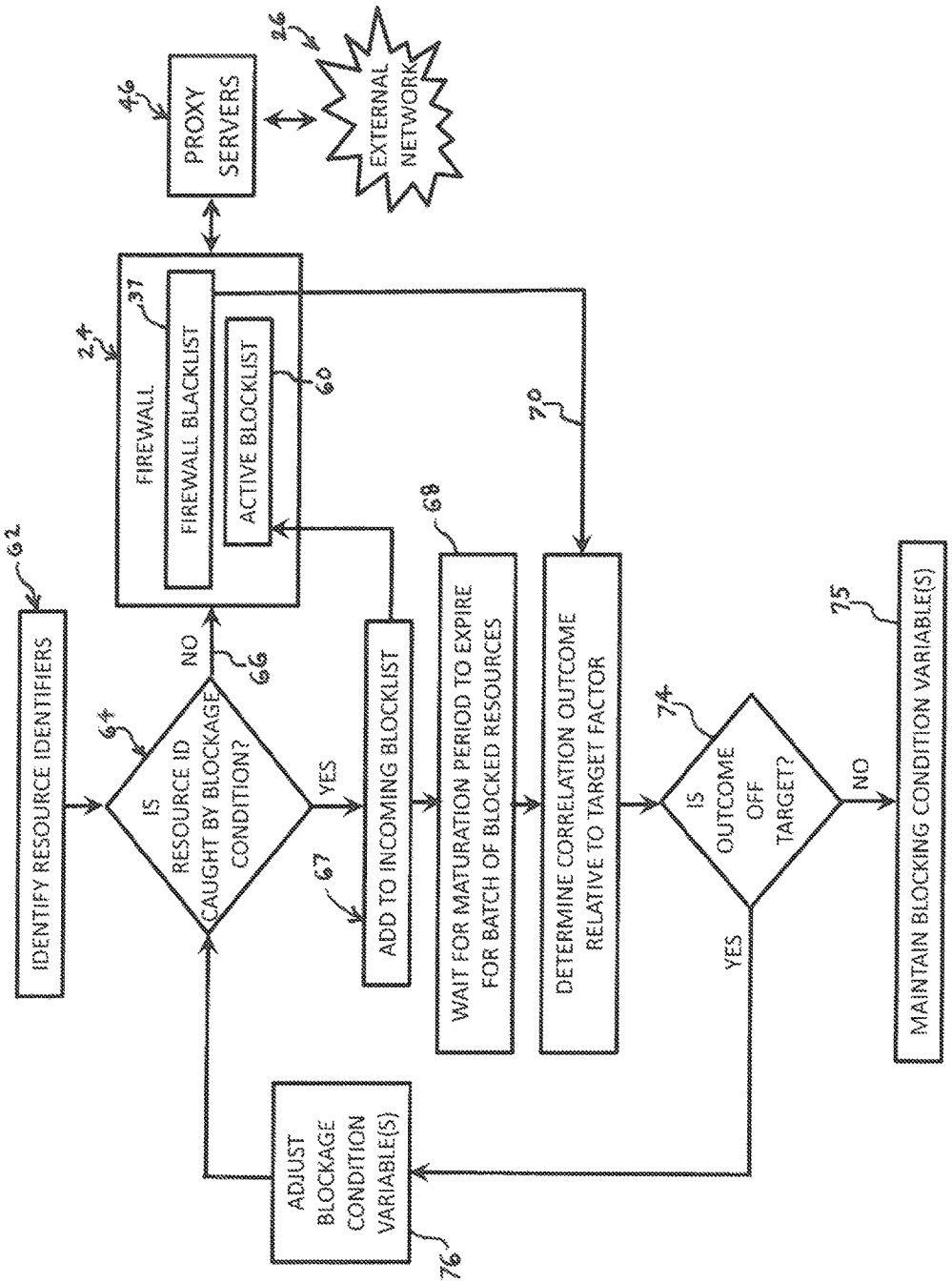
FIG. 4 is a flow diagram illustrating an example of an embodiment of the optimization method or optimization steps implemented by an embodiment of the security module.

Next, after the maturation periods of the batch expire, the optimizer 56 retrieves data from the firewall blacklist 37, as illustrated by step 70 in FIG. 4. Such data from the firewall blacklist 37, compiled after the maturation periods, represents the following result for each one of the resources 28 in the batch that had been on the active blocklist 60 and each one that had never been on the active blocklist 60:

(a) 0: a threat event, wherein the resource 28 was found to be illegitimate (or suspicious of being illegitimate) because it is listed on the firewall blacklist 37; or (b) 1: a non-threat event, wherein the resource 28 was not found to be illegitimate (or suspicious of being illegitimate) because it is not listed on the firewall blacklist 37.

The optimizer 56 then applies a mathematical correlation formula 71 (FIG. 3), such as correlation formula 72 (FIG. 6) or another suitable correlation formula, to determine a correlation of the precautionary events to the threat events. The optimizer 56 compares the outcome of such correlation calculation to a designated correlation target factor 73, as indicated by step 74 in FIG. 4. In an embodiment, if the outcome is the same as the designated correlation target factor 73 or deviates within a suitable range of the correlation target factor 73, the optimizer 56 does not adjust or change any variables of the blockage condition 55, as indicated by step 75 in FIG. 4.

In an embodiment, if the outcome deviates from the designated correlation target factor 73 by any magnitude or by a designated magnitude, the optimizer 56 automatically changes or adjusts one or more variables of the blockage condition 55, as illustrated by step 76. For example, if the outcome is less than the correlation target factor 73, the optimizer 56 automatically increases the common threat variable 59 (FIG. 3) by a designated magnitude. If the outcome is greater than the correlation target factor 73, the optimizer 56 automatically decreases the common threat variable 59 by a designated magnitude.

In an embodiment, the optimizer 56 periodically, continuously and automatically performs the foregoing steps on a batch-by-batch basis for the resources 28. In doing so, the optimizer 56 is operable to incrementally regulate one or more variables of the blockage condition 55, changing them gradually upward or downward in magnitude. This regulation, a technical advantage, can operate as a self-tuning mechanism to minimize or reduce the instances of false-positive blockages, that is, the blockage of resources 28 that, ultimately, were not found to be illegitimate by the firewall 24.

The reduction of false-positive blockage solves or alleviates a substantial technical problem faced by organizations. Organizations have been hampered by security products that over-block websites, leading to high blockage of young websites that ultimately are not found to be illegitimate. The lack of access to helpful website resources can cause a loss in employee productivity and a decline in the efficacy, timeliness and quality of labor output. This problem can be compounded by spikes or booms in new website registrations, increasing the likelihood of false-positive blockages. As described above, the optimizer 56 implements a technical solution that automatically adjusts and regulates the degree of blockage (or blockage criteria) based on actual firewall outcomes which, in turn, correspond to actual events in society, such as booms in new website registrations.

Figure 5:
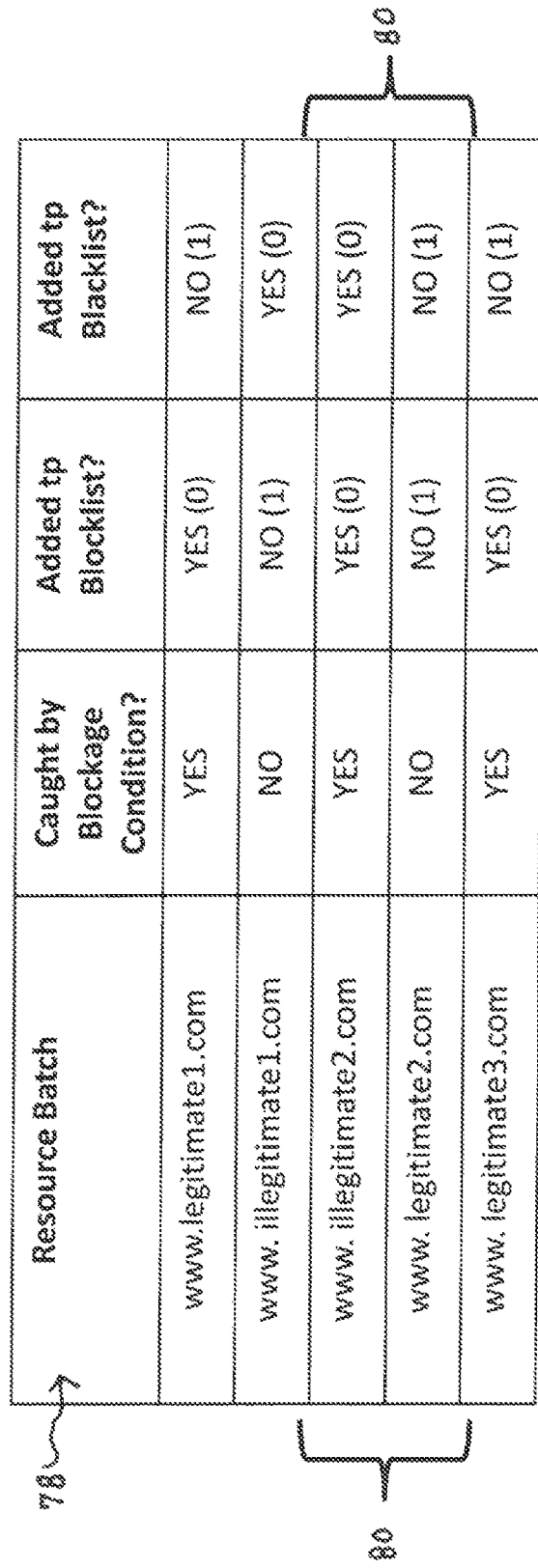
FIG. 5 is a table illustrating example results of evaluating a batch of resources with respect to a blockage condition, blocklist and blacklist.

In an example illustrated in FIG. 5, the optimizer 56 automatically processed a batch 78 of five resources 28 after the maturation periods of such resources 28 expired. In this example, the maturation period for each such resource 28 was thirty (30) days. As illustrated, the security module 22 blocked three of the resources 28 (adding them to the active blocking list 60) and allowed access to two of the resources 28. As shown in this example, the security module 22 successfully matched the blacklist determinations for a resource set 80. The resource set 80 included two of the five resources 28 corresponding to a success rate or match rate of two-fifths or forty percent (40%).

Continuing with this example, the optimizer 56 applied the correlation steps 68, 70, 74, 75 and 76 (FIG. 4), processed these results, determined a designated deviation from the correlation target factor 73 (FIG. 3) and caused an incremental adjustment to one or more of the variables of the blockage condition 55. This adjustment optimized the analyzer 39 (FIG. 3) to increase the match rate or otherwise reduce the instances of false-positive blockages.

In an embodiment, the optimizer 56 is programmed to automatically perform correlation steps 68, 70, 74, 75 and 76 (FIG. 4) upon each passage of a maturation period along a non-ending or infinite timeline. In this example, where the maturation period is thirty (30) days, the infinite timeline can include: (a) a starting point of 0 coinciding with an organization's initial activation of security module 22; (b) a correlation point of 1 at the 30 day mark following the starting point of 0; (c) a correlation point of 2 at the 60 day mark following the starting point of 0; (d) a correlation point of 3 at the 90 day mark following the starting point of 0; and (e) subsequent, sequential correlation points based on this logic. Based on this ongoing, non-ending process, the optimizer 56 continuously and autonomously improves, develops and adapts the security module 22 to provide the technical advantage of reducing the instances of false-positive blockages taking into account variable societal events or other events.

Figure 6:
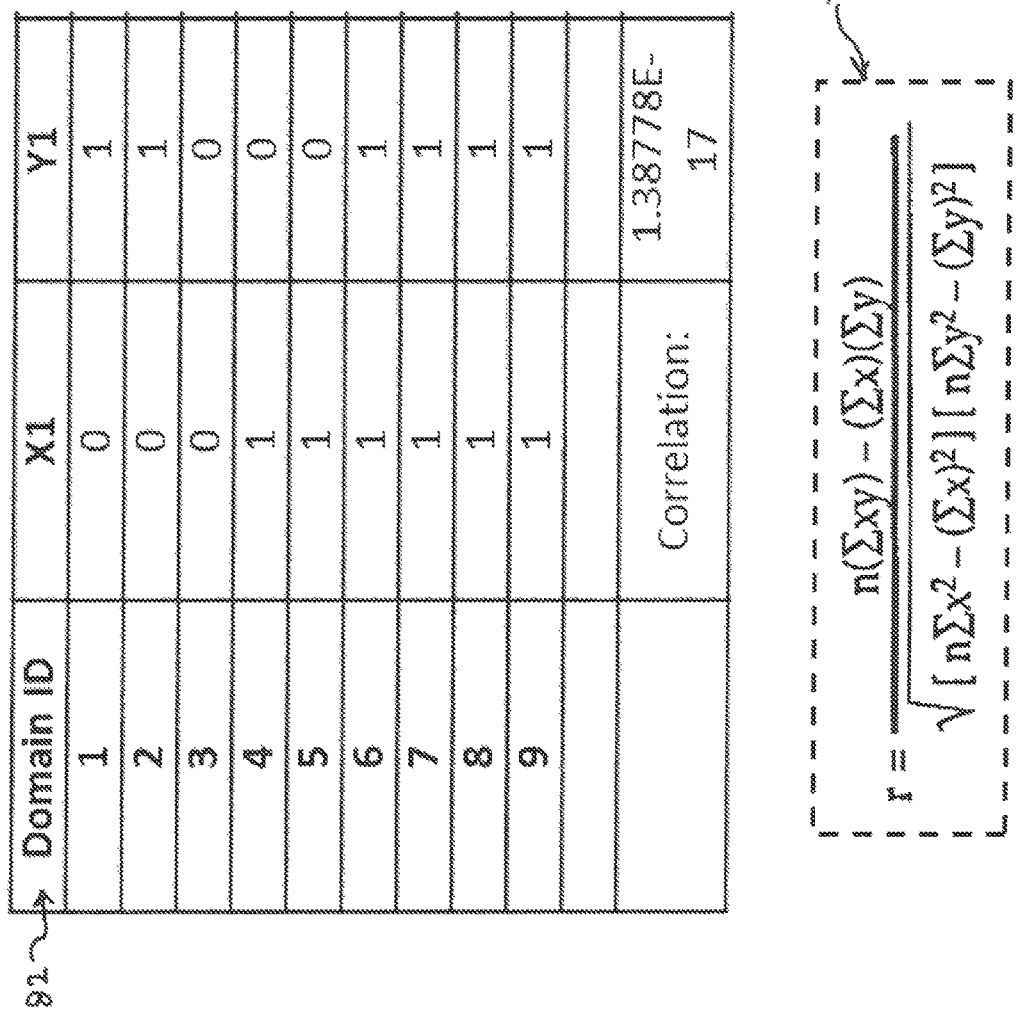
FIG. 6 is a table illustrating: (a) other example results of evaluating another batch of resources with respect to a blockage condition, blocklist and blacklist; and (b) an embodiment of a correlation formula implemented in such evaluation.

In another example illustrated in FIG. 6, the optimizer 56 automatically processed a batch 82 of nine (9) resources 28. In this example, the common threat variable 59 (FIG. 3) of the blockage condition 55 was fifty (50). The optimizer 56 included correlation formula 72 and specified the following:

(a) A target correlation outcome of 0.80, where 1 represents a strong positive relationship, 0 represents no relationship, and −1 represents a strong negative relationship;

(b) 0: blockage action (caught by blockage condition 55);

(c) 1: allowance action (not caught by blockage condition 55); and (d) Adjustment increments: 2 units.

With respect to correlation formula 72:

(a) R represents the computed correlation.

(b) X represents the Boolean result list (0 or 1) of whether or not the blocker 54 (FIG. 3) added the resource 28 to the active blocklist 60 for temporary blockage.

(c) Y represents the Boolean result list (0 or 1) of whether or not the firewall blacklist 37 (FIG. 2), as updated, lists the resource 28 for long term or permanent blockage.

In this example, X1 represents the action taken by security module 22 at the moment the analyzer 39 first processed each resource 28 in batch 82. X2 represents the action taken by security module 22 thirty (30) days later for each resource 28 in batch 82 based on the firewall blacklist 37 updated at that time.

Continuing with this example, the optimizer 56 applied the correlation formula 72 to the results shown in FIG. 6, including a correlation outcome of $1.38778\times10^{-17}$, approximately zero. Since the correlation outcome was zero and the target was 0.80, the optimizer 56 automatically adjusted the common threat variable 59, fifty (50), to accept more threat by adding two (2), increasing the common threat variable 59 to fifty-two (52).

If the correlation outcome were negative one-half (−0.50), the optimizer 56 would have automatically adjusted the common threat variable 59, fifty (50), to decrease threat by deducting two (2), thereby decreasing the threat variable to forty-eight (48). If the correlation outcome were zero (0), the optimizer 56 would not have changed or adjusted the common threat variable 59, fifty (50).

Figure 8:
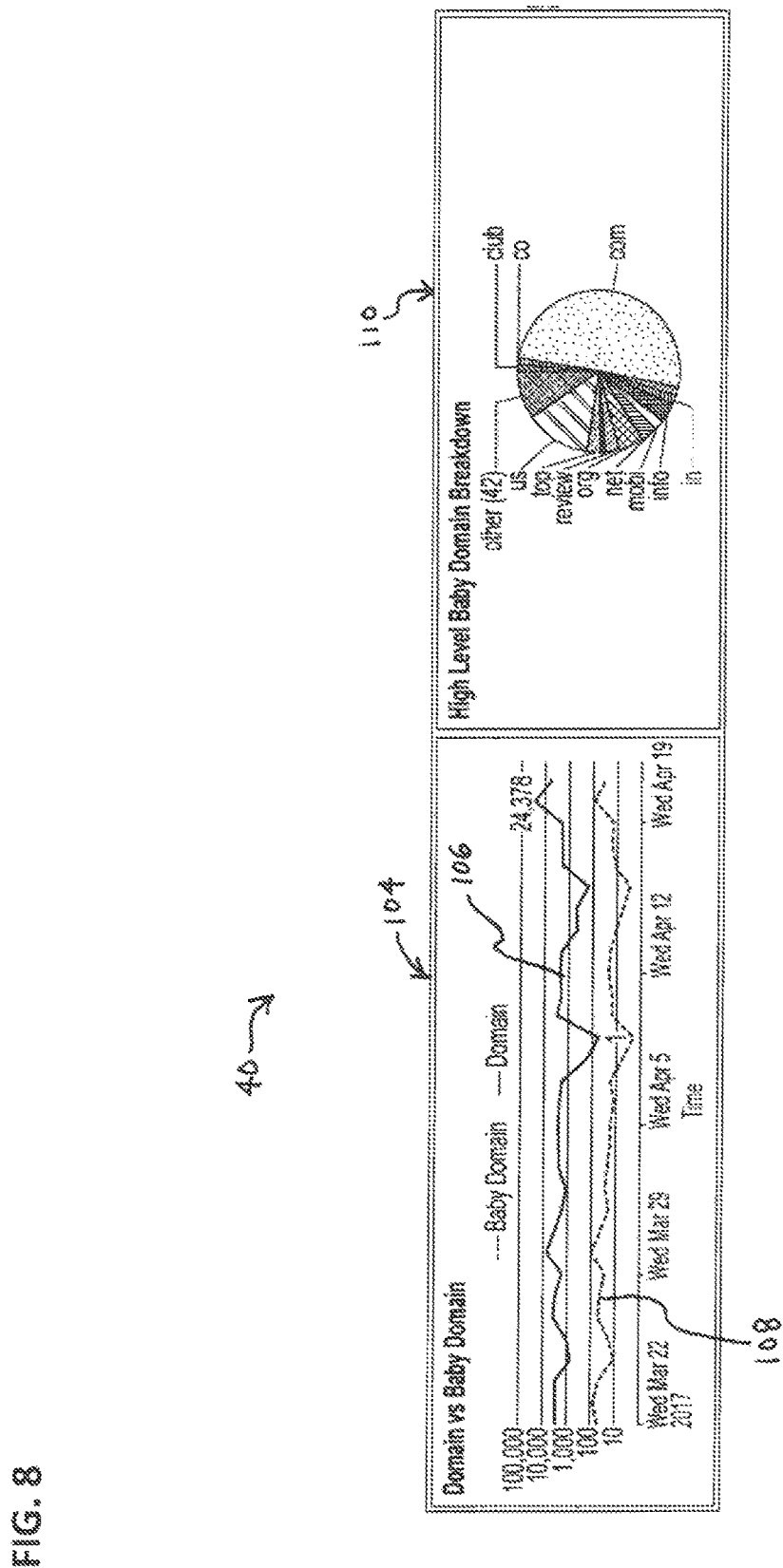
FIG. 8 is a top view of an example of an embodiment of other portions of the interface of FIG. 7.

Referring to FIGS. 7-8, in an embodiment, the interface 40 includes a plurality of graphical user interfaces ("GUIs") associated with reporting information or generating output. In an embodiment, the interface 40 includes a graphical dashboard configured to provide real-time monitoring, reporting and alerting capabilities for the security module 22. Such interface 40 receives a continuous feed of data from the security databases 33 (FIG. 1), including information about the resources 28. The IT staff and security centers of an organization can monitor such information as an aid in their management of the organization network 10. In an embodiment, the security module 22 automatically updates the interface 40 periodically, such as once per hour, twice per hour, or once per each fraction of an hour, fraction of a minute or fraction of a second.

In the embodiment illustrated in FIGS. 7-8, the interface 40 includes:

(a) a total count interface 83 (FIG. 7) configured to state, display or graphically indicate the total quantity or total count 84 of resources 28 that have been identified by the proxy servers 46 and evaluated by the security module 22, including blocked resources 87 and the other resources 28 that were not blocked because they did not satisfy the blockage condition 55;

(b) a blockage count interface 85 (FIG. 7) configured to state, display or graphically indicate the total quantity or total count 86 of blocked resources 87 (some of which are listed in FIG. 7)—resources 28 that have been blocked by security module 22 and added to the active blocklist 60, together with the user name, IP address and timestamp corresponding to the original attempted attack for each such blocked resource 87;

(c) a risk ranking list 88 (FIG. 7) of blocked resources 87, listing the blocked resources 87 according to the particular risk factor 89 of each one of the blocked resources 87, where the blocked resources 87 are sorted from highest risk score (associated with greatest threat) to lowest risk score (associated with lowest threat);

(d) a first user hit list 90 (FIG. 7) that states, displays, indicates or lists the hit count 92—the total quantity of times that all users have attempted to access (e.g., clicked) the blocked resources 87 based on data feed from data source 91, listing the attempt quantity and unique user count 94 for each one of the blocked resources 87, where those with the highest attempt quantity are located at the top of the list;

(e) a second user hit list 96 (FIG. 7) that states, displays, indicates or lists the hit count 98—the total quantity of times that all users have attempted to access (e.g., clicked) the blocked resources 87 based on data feed from data source 100, a source different from data source 91;

(f) a time chart or time graph 104 (FIG. 8) that displays, through hour-by-hour increments: (i) a first indicator 106 (e.g., first line) that graphically represents the total quantity of all resources 28 that the security module 22 has analyzed or processed; and (ii) a second indicator 108 (e.g., second line) that graphically represents the total quantity of blocked resources 86;

(g) a domain extension graph or chart 110 (FIG. 8) illustrating all of the blocked resources 87 categorized by TLD extension, including, but not limited to, .COM, .EDU, .NET, .INFO, .ORG, and .GOV; and (h) a status list (not shown) that states, displays, indicates or lists the status (blocked or unblocked) for each one of the blocked resources 87, in which case the status is blocked or unblocked (i.e., allowed) as result of the expiration of the applicable maturation period.

Viewing or receiving outputs from the interface 40, the IT staff and security centers of an organization can monitor and manually make changes to the accessibility status of the resources 28 and 87. For example, an IT staff member can manually remove a blocked resource 87 from the active blocklist 60 if, for example, the IT staff team has determined that such resource is legitimate. Likewise, an IT staff member can manually add a resource 28 to the incoming blocklist 58 (causing it to be added to the active blocklist 60) if, for example, the IT staff team has determined that such resource is illegitimate or suspicious of being illegitimate.

In an embodiment, the security module 22 includes a messenger that is operatively coupled to the interface 40. Depending upon the embodiment, the messenger can include an email module configured to send emails, a direct message module configured to send text messages, such as Short Message Service ("SMS") messages or Multimedia Messages ("MMS"), a phone module configured to generate phone calls or a facsimile module configured to send facsimile transmissions. In an embodiment, the messenger is programmed to automatically send alerts or alert messages to the IT staff, IT security centers, employees or users of an organization via email, text, phone, facsimile or another suitable method. The alert messages correspond to or otherwise indicate threat and other information available through the interface 40.

In an embodiment, as described above, security module 22 and security filter 23 are stored within security databases 33 (FIG. 1). One or more processors (e.g., processor 36) can access security databases 33 over any suitable type of network, or such one or more processors can access security databases 33 directly if the security databases 33 and such processors are parts of a single server unit. In addition, the user devices 12 can access security databases 33 over any suitable type of network, such as organization network 10 (FIG. 1). Depending upon the embodiment, such network can include one or more of the following: a wired network, a wireless network, an LAN, an extranet, an intranet, a WAN (including, but not limited to, the Internet), a virtual private network ("VPN"), an interconnected data path across which multiple devices may communicate, a peer-to-peer network, a telephone network, portions of a telecommunications network for sending data through a variety of different communication protocols, a Bluetooth® communication network, a radio frequency ("RF") data communication network, an infrared ("IR") data communication network, a satellite communication network or a cellular communication network for sending and receiving data through short messaging service ("SMS"), multimedia messaging service ("MMS"), hypertext transfer protocol ("HTTP"), direct data connection, Wireless Application Protocol ("WAP"), email or any other suitable message transfer service or format.

In an embodiment, such one or more processors (e.g., processor 36) can include a data processor or a central processing unit ("CPU"). Each such one or more data storage devices can include, but is not limited to, a hard drive with a spinning magnetic disk, a Solid-State Drive ("SSD"), a floppy disk, an optical disk (including, but not limited to, a CD or DVD), a Random Access Memory ("RAM") device, a Read-Only Memory ("ROM") device (including, but not limited to, programmable read-only memory ("PROM"), electrically erasable programmable read-only memory ("EPROM"), electrically erasable programmable read-only memory ("EEPROM"), a magnetic card, an optical card, a flash memory device (including, but not limited to, a USB key with non-volatile memory, any type of media suitable for storing electronic instructions or any other suitable type of computer-readable storage medium. In an embodiment, an assembly includes a combination of: (a) one or more of the security databases 33 that store security module 22; and (b) one or more of the foregoing processors (e.g., processor 36).

Referring to FIG. 1, the users of security module 22 and the implementor of security module 22 can use or operate any suitable input/output (I/O) device to transmit inputs to processor 36 and to receive outputs from processor 36, including, but not limited to, any of the user devices 12 (FIG. 1), a personal computer (PC) (including, but not limited to, a desktop PC, a laptop or a tablet), smart television, Internet-enabled TV, person digital assistant, smartphone, cellular phone or mobile communication device. In one embodiment, such I/O device has at least one input device (including, but not limited to, a touchscreen, a keyboard, a microphone, a sound sensor or a speech recognition device) and at least one output device (including, but not limited to, a speaker, a display screen, a monitor or an LCD).

In an embodiment, the security module 22 and security filter 23 include computer-readable instructions, algorithms and logic that are implemented with any suitable programming or scripting language, including, but not limited to, C, C++, Java, COBOL, assembler, PERL, Visual Basic, SQL Stored Procedures or Extensible Markup Language (XML). Security module 22 and security filter 23 can each be implemented with any suitable combination of data structures, objects, processes, routines or other programming elements.

In an embodiment, the interface 40 can include GUIs structured based on any suitable programming language. Each GUI can include, in an embodiment, multiple windows, pull-down menus, buttons, scroll bars, iconic images, wizards, the mouse symbol or pointer, and other suitable graphical elements. In an embodiment, the GUIs incorporate multimedia, including, but not limited to, sound, voice, motion video and virtual reality interfaces to generate outputs of security module 22.

In an embodiment, the memory devices and data storage devices described above can be non-transitory mediums that store or participate in providing instructions to a processor for execution. Such non-transitory mediums can take different forms, including, but not limited to, non-volatile media and volatile media. Non-volatile media can include, for example, optical or magnetic disks, flash drives, and any of the storage devices in any computer. Volatile media can include dynamic memory, such as main memory of a computer. Forms of non-transitory computer-readable media therefore include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read programming code and/or data. Many of these forms of computer readable media may be involved in carrying one or more sequences of one or more instructions to a processor for execution. In contrast with non-transitory mediums, transitory physical transmission media can include coaxial cables, copper wire and fiber optics, including the wires that comprise a bus within a computer system, a carrier wave transporting data or instructions, and cables or links transporting such a carrier wave. Carrier-wave transmission media can take the form of electric or electromagnetic signals, or acoustic or light waves such as those generated during RF and IR data communications.

It should be appreciated that at least some of the subject matter disclosed herein includes or involves a plurality of steps or procedures. In an embodiment, as described, some of the steps or procedures occur automatically or autonomously as controlled by a processor or electrical controller without relying upon a human control input, and some of the steps or procedures can occur manually under the control of a human. In another embodiment, all of the steps or procedures occur automatically or autonomously as controlled by a processor or electrical controller without relying upon a human control input. In yet another embodiment, some of the steps or procedures occur semi-automatically as partially controlled by a processor or electrical controller and as partially controlled by a human.

It should also be appreciated that aspects of the disclosed subject matter may be embodied as a method, device, assembly, computer program product or system. Accordingly, aspects of the disclosed subject matter may take the form of an entirely hardware embodiment, an entirely software embodiment (including firmware, resident software, micro-code, etc.), or an embodiment combining software and hardware aspects that may all, depending upon the embodiment, generally be referred to herein as a "service," "circuit," "circuitry," "module," "assembly" and/or "system." Furthermore, aspects of the disclosed subject matter may take the form of a computer program product embodied in one or more computer readable mediums having computer readable program code embodied thereon.

Aspects of the disclosed subject matter are described herein in terms of steps and functions with reference to flowchart illustrations and block diagrams of methods, apparatuses, systems and computer program products. It should be understood that each such step, function block of the flowchart illustrations and block diagrams, and combinations thereof, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create results and output for implementing the functions described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions described herein.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A method comprising:
monitoring a network for a plurality of requests to access a plurality of resources;
blocking each of the resources that satisfies a blockage condition, wherein the blockage condition comprises at least one variable associated with an age factor;
adding each of the blocked resources to a blocklist, wherein:
(a) each of the blocked resources is associated with a maturation period that depends, at least in part, on a creation date of the blocked resource; and
(b) a presence of each of the blocked resources on the blocklist corresponds to a precautionary event;
after the maturation periods expire for a batch of the blocked resources:
(a) determining whether each of the blocked resources of the batch is listed on a blacklist, wherein:
(i) a presence of one of the blocked resources on the blacklist corresponds to a threat event; and
(ii) an absence of one of the blocked resources from the blacklist corresponds to a non-threat event;
(b) determining a correlation outcome for the batch of the blocked resources, wherein the correlation outcome represents a correlation of the precautionary events to the threat events;
if the correlation outcome is less than a correlation target factor, increasing the at least one variable and, in a future, repeating the blocking step for any resources that satisfy the blockage condition; and
if the correlation outcome is greater than the correlation target factor, decreasing the at least one variable and, in the future, repeating the blocking step for any resources that satisfy the blockage condition,
wherein any increasing or decreasing of the at least on variable is operable to reduce blockage of any of the resources that corresponds to one of the non-threat events.

2. The method of claim 1, wherein the resources are operatively coupled to an Internet, and each of the resources is associated with a unique identifier.

3. The method of claim 2, wherein the blocklist comprises data corresponding to at least a portion of each one of the unique identifiers of the blocked resources.

4. The method of claim 2, wherein:
the blacklist comprises data corresponding to at least a portion of the unique identifier of each one of the resources that is determined by a blacklist source to correspond to one of threat events; and
each one of the threat events comprises an assessment that the resource corresponding to the threat event is associated with one of an illegitimate purpose, a malicious purpose, a wrongful purpose, a harmful purpose, a threatening purpose, an illegal purpose, a trespass purpose, a damaging purpose, a theft purpose, a ransom purpose, a cyberattack purpose, or an infection purpose.

5. The method of claim 4, wherein the blacklist comprises data received from a blacklist source outside of the network.

6. The method of claim 1, wherein the at least on variable is associated with a risk factor, wherein each one of the resources comprises a risk level, wherein the blocking step comprises processing the at least on variable.

7. The method of claim 6, comprising blocking each of the resources that comprises a risk level that is greater than the risk factor even though the resource comprises an age level over the age factor.

8. The method of claim 6, wherein, for each one of the resources, the at least on variable comprises the age factor and the risk factor, wherein the method comprises changing the at least on variable if the correlation outcome deviates from the correlation target factor by a designated magnitude, wherein the designated magnitude is greater than zero.

9. One or more data storage devices comprising instructions that, when executed by a processor, perform a plurality of steps comprising:
monitoring a network for a plurality of requests to access a plurality of resources;
blocking each of the resources that satisfies a blockage condition, wherein the blockage condition comprises at least one variable;
adding each of the blocked resources to a blocklist, wherein:
each of the blocked resources is associated with a maturation period that depends, at least in part, on a creation date of the blocked resource; and
a presence of each of the blocked resources on the blocklist corresponds to a precautionary event;
after the maturation period expires for each of the blocked resources, determining whether the blocked resource is listed on a blacklist, wherein a presence of the blocked resource on the blacklist corresponds to a threat event; and
determining a correlation outcome that represents a correlation of the precautionary events to the threat events; and
changing the at least one variable in response to the correlation outcome differing from a correlation target factor by a designated amount.

10. The one or more data storage devices of claim 9, wherein:
the at least one variable is mathematically coupled to an age factor and a risk factor; and
the designated amount comprises any amount greater than zero.

11. The one or more data storage devices of claim 9, wherein:
the resources comprise a plurality of Internet domains, and each of the resources comprises a unique URL; and
the blocklist comprises data corresponding to at least a portion of each one of the unique URLs of the blocked resources.

12. The one or more data storage devices of claim 10, wherein the blacklist comprises data corresponding to at least a portion of the URL of any of resources that are determined by a blacklist source to be associated with one of the threat events.

13. The one or more data storage devices of claim 10, wherein each one of the threat events comprises a judgment that the resource corresponding to the threat event is associated with one of an illegitimate purpose, a malicious purpose, a wrongful purpose, a harmful purpose, a threatening purpose, an illegal purpose, a trespass purpose, a damaging purpose, a theft purpose, a ransom purpose, a cyberattack purpose, or an infection purpose.

14. The one or more data storage devices of claim 9, wherein:
wherein the at least one variable is mathematically coupled to an age factor; and
the maturation period is equal to or greater than the age factor.

15. The one or more data storage devices of claim 9, wherein the blacklist comprises data received from a blacklist source outside of the network.

16. The one or more data storage devices of claim 9, wherein:
the at least one variable is mathematically coupled to a risk factor; and
the one or more data storage devices comprises at least one instruction that, when executed by a processor, causes the processor to process the risk factor associated with each one of the resources.

17. The one or more data storage devices of claim 16, wherein:
the at least one variable is mathematically coupled to an age factor; and
the one or more data storage devices comprises at least one instruction that, when executed by a processor, causes the processor to block any one of the resources that comprises one of the risk factors that corresponds to a designated level of risk even though the resource is aged over the age factor.

18. An assembly comprising:
one or more processors; and
one or more data storage devices operatively coupled to the one or more processors, wherein the one or more data storage devices comprise instructions that, when executed by the one or more processors, perform a plurality of steps comprising:
monitoring a network for a plurality of requests to access a plurality of resources;
blocking each of the resources that satisfies a blockage condition comprising at least one variable;
adding each of the blocked resources to a blocklist, wherein:
each of the blocked resources is associated with a maturation period that depends, at least in part, on a creation date of the blocked resource;
a presence of each of the blocked resources on the blocklist corresponds to a precautionary event;
after the maturation period expires for each of the blocked resources, determining whether the blocked resource is listed on a blacklist, wherein a presence of the blocked resource on the blacklist corresponds to a threat event; and
determining a correlation outcome that represents a correlation of the precautionary events to the threat events; and
changing the at least one variable in response to the correlation outcome differing from a correlation target factor by a designated amount.

19. The assembly of claim 18, wherein:
the resources comprise a plurality of Internet domains, and each of the resources comprises a unique URL;
the blocklist comprises data corresponding to at least a portion of each one of the unique URLs of the blocked resources; and
the blacklist comprises data corresponding to at least a portion of the URL of any one of the resources that, according to a blacklist source, correspond to one of the threat events.

20. The assembly of claim 18, wherein each one of the threat events is based on an assessment that the resource corresponding to the threat event is associated with one of an illegitimate purpose, a malicious purpose, a wrongful purpose, a harmful purpose, a threatening purpose, an illegal purpose, a trespass purpose, a damaging purpose, a theft purpose, a ransom purpose, a cyberattack purpose, or an infection purpose.

* * * * *